Sept. 18, 1962 A. MACCHIA 3,054,321
SCREW ASSEMBLY WITH BALL AND SOCKET CONNECTION
Filed July 15, 1959
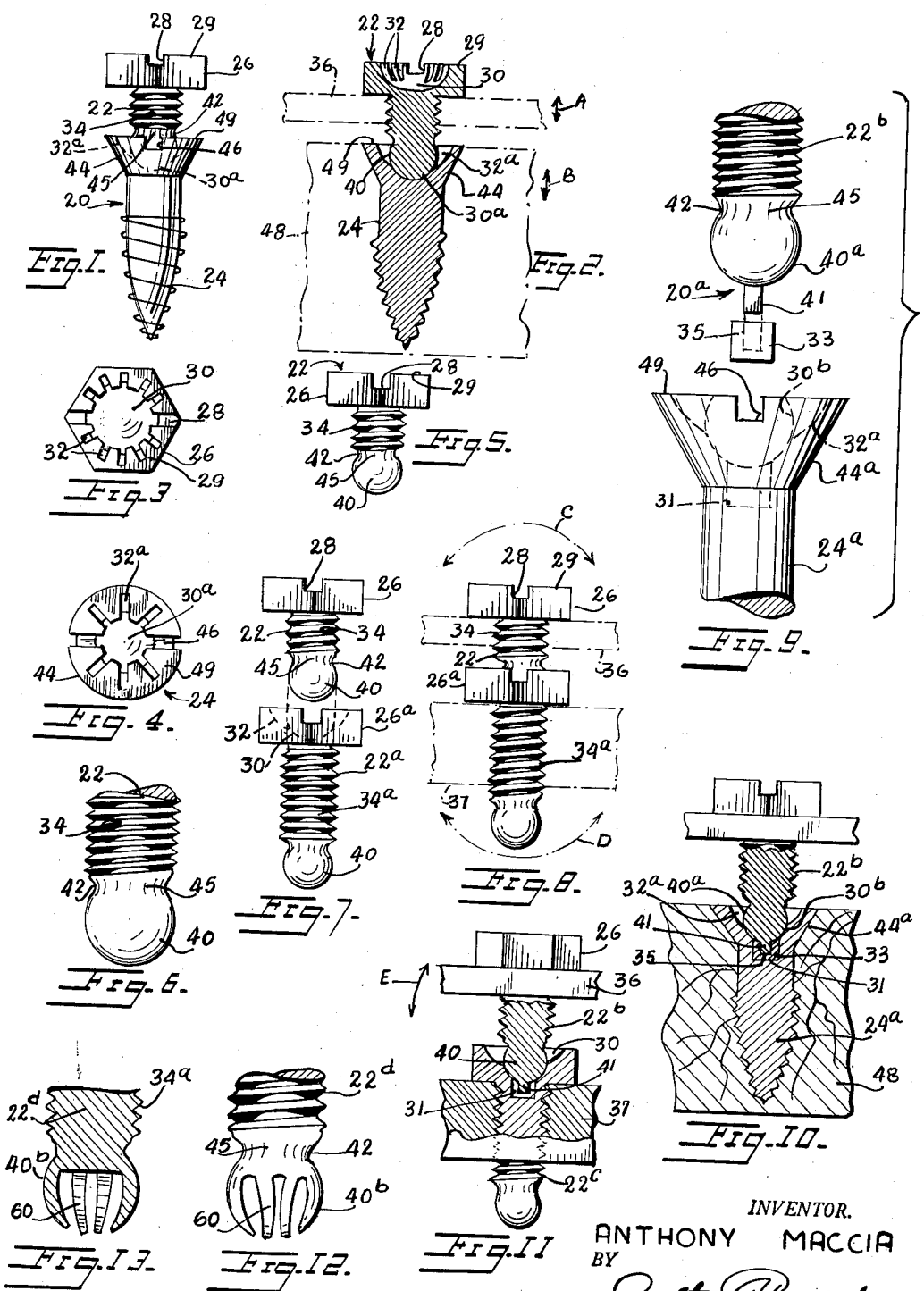
INVENTOR.
ANTHONY MACCHIA
BY
ATTORNEY

United States Patent Office 3,054,321
Patented Sept. 18, 1962

3,054,321
SCREW ASSEMBLY WITH BALL AND SOCKET CONNECTION
Anthony Macchia, 2219 Seward Ave., Bronx, New York, N.Y.
Filed July 15, 1959, Ser. No. 827,201
1 Claim. (Cl. 85—9)

This invention relates to the art of fasteners and more particularly concerns a ball and socket joint for screws, bolts and the like.

The invention is directed at and has as a principal purpose, provision of a quick detachable connection for screws and the like threaded members employed in electrical circuits.

A further object is to provide two threaded members with a quick detachable connection including a ball and socket joint so that limited pivotable movement is possible between the members while electrical continuity between the members is maintained.

Another object is to provide a threaded member with a head having a partially spherical socket therein and with an associated member having a partially spherical tip at the end of a threaded shank, the ball and socket being detachably engageable.

A still further object is to provide a member having a threaded shank and a head, with a partially spherical cavity in the head and with slots radiating from the cavity to render the cavity expansible for receiving a partially spherical end of a mating member therein.

Another object is to provide a threaded member assembly, one of said members having a partially spherical end and the other member having a head with a socket receiving said ball end, said head having radial slots rendering the socket expansible so that the partially spherical end is removably engaged in said socket.

A further object is to provide a threaded member assembly of the character described, wherein said partially spherical end has a projecting stud engageable in a cylindrical bore extension of said socket, and with a removable cup insert disposed in said bore and receiving said stud.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is an elevational view of a screw assembly embodying the invention.

FIG. 2 is a longitudinal central, sectional view of the assembly of FIG. 1.

FIG. 3 is a top plan view of one of the members of the assembly of FIG. 1.

FIG. 4 is a top plan view of another of the members of the assembly of FIG. 1.

FIG. 5 is an elevational view of the member of FIG. 3 taken alone, and disengaged from the assembly.

FIG. 6 is a fragmentary elevational view on an enlarged scale of an end portion of the member of FIG. 5.

FIG. 7 is an exploded elevational view of another assembly of members according to the invention.

FIG. 8 is an elevational view of the members of FIG. 7 arranged into an assembly according to the invention.

FIG. 9 is a fragmentary exploded elevational view on an enlarged scale of members of another connector assembly according to the invention.

FIG. 10 is a sectional view of the members of FIG. 9 arranged in a connected assembly.

FIG. 11 is a sectional view of a further modified connector assembly.

FIGS. 12 and 13 are elevational and sectional views respectively of another form of partially spherical end construction of a screw.

Referring to FIGS. 1 and 2 there is shown a screw connector assembly 20 including a machine screw 22 and a wood screw 24. The machine screw has a hexagonal head 26 most clearly shown in FIG. 3. In the head 26 may be screw driver slots 28 extending transversely thereacross. A partially scherical cavity 30 is formed in the head. A plurality of slanted or curved slots 32 extend radially outward from the wall of the cavity upwardly to the flat top 29 of the head. The screw 22 has a threaded shank 34 which can be screwed through a panel 36 indicated by dotted lines in FIG. 2. The free end of the shank is formed as a partially spherical tip 40 as clearly shown in FIG. 5. A neck 42 interconnecting the tip and threaded portion of the shank may be scored or knurled as shown at 45. The tip 40 is removably engaged in a partially spherical cavity or socket 30ᵃ formed in the conical head 44 of the wood screw 24. This head has screwdriver slots 46 by means of which the screw can be threaded in countersunk fashion into a panel 48 indicated by dotted lines in FIG. 2. Cavity 30ᵃ has inclined or slanting radial slots 32ᵃ similar to slots 32 as clearly shown in FIG. 4. The slots extend from the circumference of the cavity which is parallel to the flat top 49 of the head, up to the top of the head. These slots permit the tip 40 to snap into and out of the socket 30ᵃ.

When the screws and panels are assembled as indicated in FIG. 2. The panels are independently tiltable or rockable with respect to each other as indicated by arrows A and B in FIG. 2. If one panel is grounded electrically, this electrical ground will be maintained in all positions of tilt of the other panel due to the universal joint afforded by the ball and socket connection between the threaded members in the respective panels.

FIG. 6 clearly shows the partially spherical end 40 of the shank 34 of screw 22. FIGS. 7 and 8 show screw 22 and another screw 22ᵃ detachably connected together. The partially spherical end 40 of screw 22 is engaged in socket 30 in the head 26ᵃ of screw 22ᵃ. Screw 22ᵃ is constructed like screw 22 except for a slightly longer threaded shank 34ᵃ. Panel 37 in which screw 22ᵃ may be seated can be thicker than panel 36 as clearly shown in FIG. 8. The universally, rockable, detachable connection of the screws and panels is indicated by arrows C and D. The panels are, of course, detachably connected by means of the snap joint between the partially spherical end 40 of screw 22 and the socket 30 in the head 26ᵃ of screw 22ᵃ.

FIGS. 9 and 10 illustrate a structure for modifying the universal joint connection between the partially spherical tip and the partially spherical socket of the several threaded elements. Partially spherical tip 40ᵃ at the end of screw 22ᵇ has a stud extension 41. The partially spherical socket 30ᵇ in head 44ᵃ of screw 24ᵃ is partially spherical and has a peripheral bore extension 31 having a cylindrical wall. A cylindrical cup 33 has its external diameter and axial length equal to the diameter and axial length of the bore extension 31, and removably fits therein. A cylindrical axial recess 35 is provided in the cup. This recess has the same diameter and length as those of the stud 41. Thus the assembly 20a formed as shown in FIG. 10 permits the screw 22ᵇ to be rotated with respect to screw 24ᵃ on a common axis while preventing rocking of the screws and the plates or panels 36, 48 engaged therewith. The partially spherical tip 40ᵃ may freely rotate in the socket 30ᵇ but the panels will remain parallel to each other. If limited relative rocking movement of the panels is desired, then the structure may be modified by omitting cup 33. The rocking movement permitted will then be restricted by the contact between the stud 41 and the adjacent wall of bore extension 31.

FIG. 11 illustrates the ball and socket connection just described, as applied to screws 22ᵇ and 22ᶜ which are similar to screws 22 and 22ᵃ, respectively, except that the cylindrical cup 33 has been omitted from the bore extension 31 provided in the cavity 30ᵇ of the head of screw 22ᶜ. With this arrangement the panels 36 and 37 have free relative rotational movement parallel to each other and limited universal rocking movement as indicated by arrow E. The stud 41 operates as a stop element to limit the rocking movement. This structure may be desired when used when it is desired that the panels be mutually rockable without touching each other, as may otherwise occur with the universally jointed construction of FIG. 2.

Although the machine screws are shown as having hexagonal heads, they can of course have round, square or other shaped heads, and the screwdriver slots may be omitted, if the heads are to be manipulated with wrenches instead of screwdrivers.

FIGS. 12 and 13 illustrate an alternate structure, for the hollow partially spherical end 40ᵇ of the threaded shank 34ᵃ of screw 22ᵈ. This partially spherical end is hollow and slotted to form resilient prongs or fingers 60 which permit snapping the partially spherical ends of the screws into and out of the sockets more readily.

One use for the snap connection screws described may be in instrument panels or automobiles. A radio, heater, clock and other accessories may be installed readily in an instrument panel by snap connections of the types described. The electrical connections between the electrical system of the automobile and each accessory would be through a snap type screw connector assembly. Another use might be in chassis assemblies of television and radio receivers in which connecting cable could be provided with snap type screws of the types described. Amplifiers, loud-speakers, and other networks could also be provided with these snap type connections. Relay units, telephones, and many other electrical components can be adjustably mounted on connector blocks and panels with the snap type connectors described.

While I have illustrated and described the preferred embodiments of my invention, it is to be understood that I do not limit myself to the precise constructions herein disclosed and that various chanegs and modifications may be made within the scope of the invention as defined in the appended claim.

Having thus described my invention, what I claim as new, and desire to secure by United States Letters Patent is:

A screw assembly, comprising a first member having a first threaded shank, a first flat head integrally formed with said shank at one end thereof, a partially spherical tip formed integrally with said shank at the other end thereof, said tip having a cylindrical stud extension, and a second member having a second threaded shank, a second flat head integrally formed with said second shank, said second flat head having a partially spherical socket with resilient walls constituting fingers formed therein, said socket having an axially disposed cylindrical bore extension, said tip being rotatably disposed in said socket and said stud extending into said axial bore extension, said resilient walls partially overlying said partially spherical socket, and a removable cylindrical cup seated in said bore extension, said cup having an external diameter and axial length substantially equal to the diameter and axial length respectively of said bore extension, said cup having an internal cylindrical recess substantially equal in diameter and axial length to the diameter and axial length respectively of said stud, said partially spherical tip being removably disposed in said socket with said stud removably extending into said recess, whereby rotational movement of said partially spherical tip and stud in said socket and cup on a common axis of rotation is permitted while lateral rocking movement of the partially spherical tip and stud in said socket and cup is prevented, said cup being removable from said bore extension so that rotational movement of said partially spherical tip and stud in said socket and bore extension is still permitted while lateral rocking movement of the partially spherical tip and stud in said socket and bore extension is limited by contact of the stud with said wall of the bore extension, said fingers coacting with the neck portion of the tip to retain the tip and socket in assembled condition.

References Cited in the file of this patent
UNITED STATES PATENTS

| | | |
|---|---|---|
| 513,949 | Munson | Jan. 30, 1894 |
| 1,048,732 | Piotrowski | Dec. 31, 1912 |
| 1,275,961 | Maynard | Aug. 13, 1918 |
| 1,328,089 | Le Chot | Jan. 13, 1920 |
| 2,302,621 | Lubshey | Nov. 17, 1942 |
| 2,580,350 | Friedberg | Dec. 25, 1951 |
| 2,612,139 | Collins | Sept. 30, 1952 |
| 2,859,059 | De Loach | Nov. 4, 1958 |

FOREIGN PATENTS

| | | |
|---|---|---|
| 261,931 | Switzerland | Sept. 1, 1949 |
| 640,046 | Great Britain | July 12, 1950 |
| 544,260 | Italy | June 13, 1956 |

OTHER REFERENCES

Electrical Manufacturing, pp. 134–137, October 1954, publication, "Mass Production of Electronic Subassemblies," by A. A. Lawson (p. 135 pertinent). Copy in Division 20. 339/17M.